United States Patent [19]

Uno et al.

[11] Patent Number: 4,986,835

[45] Date of Patent: Jan. 22, 1991

[54] PROCESS FOR SEPARATING AND RECOVERING CARBONIC ACID GAS FROM GAS MIXTURE BY ADSORPTION

[75] Inventors: Masaru Uno; Kanji Ueda; Masahiro Inoue; Shinichi Kaji, all of Hyogo, Japan

[73] Assignee: Seitetsu Kagaku Co., Ltd., Hyogo, Japan

[21] Appl. No.: 397,469

[86] PCT No.: JP88/01322

§ 371 Date: Aug. 23, 1989

§ 102(e) Date: Aug. 23, 1989

[87] PCT Pub. No.: WO89/06218

PCT Pub. Date: Jul. 13, 1989

[22] Filed: Dec. 23, 1988

[30] Foreign Application Priority Data

Dec. 26, 1987 [JP] Japan .................. 62-331729

[51] Int. Cl.$^5$ .................. B01D 53/04
[52] U.S. Cl. .................. 55/26; 55/31; 55/33; 55/62; 55/68; 55/74; 55/75
[58] Field of Search .................. 55/25, 26, 31, 33, 58, 55/62, 68, 74, 75

[56] References Cited

U.S. PATENT DOCUMENTS

| 3,594,984 | 7/1971 | Toyama et al. | 55/33 |
| 3,738,084 | 6/1973 | Simonet et al. | 55/58 X |
| 3,751,878 | 8/1973 | Collins | 55/58 |
| 3,841,058 | 10/1974 | Templeman | 55/33 |
| 3,981,698 | 9/1976 | Leppard | 55/33 X |
| 4,144,037 | 3/1979 | Armond et al. | 55/58 |
| 4,168,149 | 9/1979 | Armond et al. | 55/58 X |
| 4,233,038 | 11/1980 | Tao | 55/33 |
| 4,249,915 | 2/1981 | Sircar et al. | 55/33 X |
| 4,326,858 | 4/1982 | Benkmann | 55/33 X |
| 4,472,178 | 9/1984 | Kumar et al. | 55/58 X |
| 4,711,645 | 12/1987 | Kumar | 55/33 X |
| 4,726,815 | 2/1988 | Hashimoto et al. | 55/33 X |
| 4,732,578 | 3/1988 | Benkmann | 55/26 X |

FOREIGN PATENT DOCUMENTS

| 54-024279 | 2/1979 | Japan | 55/33 |
| 55-137026 | 10/1980 | Japan | 55/33 |
| 59-173116 | 10/1984 | Japan . |
| 61-157322 | 7/1986 | Japan . |
| 61-176540 | 8/1986 | Japan . |
| 62-136222 | 6/1987 | Japan . |

Primary Examiner—Robert Spitzer
Attorney, Agent, or Firm—Jones, Tullar & Cooper

[57] ABSTRACT

The present invention relates to a process for separating and recovering a high purity carbonic acid gas from a wet mixed gas containing carbonic acid gas which comprises using a pressure swing adsorption and separation apparatus composed of an adsorber packed with alumina gel and zeolite and carrying out the steps of adsorption, washing, desorption and pressurization.

6 Claims, 3 Drawing Sheets

PROCESS FOR SEPARATING AND RECOVERING CARBONIC ACID GAS FROM GAS MIXTURE BY ADSORPTION

TECHNICAL FIELD

The present invention relates to a process for the separating and recovering of a high purity carbonic acid gas (hereinafter referred to as $CO_2$) from a wet mixed gas containing carbonic acid gas according to a pressure swing adsorption and separation method (hereinafter referred to as the PSA method).

PRIOR ART

As disclosed in Japanese Patent Kokai No. 59-173116 and Japanese Patent Kokai No. 61-157322, when a high purity $CO_2$ is recovered from a mixed gas composed of $CO_2$ and a component whose adsorption is less than that of $CO_2$ according to the PSA method, there has been used an adsorbent such as an adsorbent containing carbon or an activated charcoal adsorbent.

On the other hand, when $CO_2$ is removed from air or a gas containing $CO_2$, the removal is generally carried out according to PSA method by using zeolite to adsorb and remove $CO_2$ gas for refining the air or the gas.

Zeolite has larger adsorption capacity of $CO_2$ in comparison with the above carbon adsorbent and, therefore, it is a very effective adsorbent for adsorption and separation of $CO_2$. However, it has been known that zeolite also has a high water adsorbability, whereas water absorbability of the carbon adsorbent is much lower than that of zeolite. Accordingly, zeolite is much liable to be affected by water in comparison with the above carbon adsorbent. Then, in the case of separation of $CO_2$ by adsorption with zeolite, it is necessary to remove water in a feeding gas to such a degree that the dew point of water becomes about $-50°$ C. or lower by a pretreatment and then introduce the feeding gas into an adsorber packed with zeolite as described in page 5, right upper column, line 5 of Japanese Patent Kokai No. 61-176540. Further, when the above pretreatment can not be carried out or it is insufficient, full desorption of adsorbed water is required to regenerate zeolite.

On the other hand, in the case of removal of $CO_2$ and water in a gas by adsorption with zeolite, the regeneration of zeolite is often carried out by flowing a part of the resulting refined gas, which is obtained by passing the gas through an adsorber packed with zeolite to completely remove water and $CO_2$ from the gas, as a purge gas for regeneration in a large amount in the direction opposite to the feeding gas flow during desorption under reduced pressure to desorb strongly adsorbed water.

When $CO_2$ which is the desorbed gas is merely removed, the above process is sufficient. However, when $CO_2$ is recovered in a high purity of 98 to 99% by volume or higher, $CO_2$ in such a high purity can not be recovered because the desorbed gas is contaminated with the purge gas as a matter of course. Thus, in the case of recovery of the desorbed $CO_2$ as a high purity $CO_2$, a large amount of the purge gas causes lowering of the purity and, therefore, it is required to develop an operating system wherein little or no purge gas for regeneration during desorption is used.

Usually, a feeding raw material gas often contains water and, when a high purity $CO_2$ is recovered with zeolite according to the PSA method, it is necessary to carry out a pretreatment to remove water in the feeding raw material gas or the above operation should be carried out. This is economically disadvantageous.

Therefore, at present, a carbon adsorbent whose adsorbability of $CO_2$ is small but water desorbability is good is inevitably used as the adsorbent instead of zeolite.

Even in such a case, when the feeding raw material gas contains a large amount of water, water can not be completely desorbed and accumulated in the adsorbent, which results in lowering of the separation ability of $CO_2$ and, therefore, the feeding raw material gas should be fed by adjusting the dew point of water therein to $5°$ to $20°$ C. (as atmospheric pressure). This has been already found and made the subject of a patent application filed as disclosed in Japanese Patent Kokai No. 62-136222.

OBJECTS OF THE INVENTION

Under these circumstances, in order to solve the above problem, it has been found that $CO_2$ can be effectively recovered by using an adsorber wherein, as adsorbents, alumina gel which has excellent water adsorptivity and desorptivity is packed in the raw material gas inlet side and zeolite is packed in the downstream side thereof, and carrying out the steps of adsorption, washing, desorption and pressurization according to the PSA method. Further, it has been found that, by utilizing an adsorption waste gas as a purge gas for regeneration during desorption as well as utilizing the adsorption waste gas as pressurization after desorption, accumulation of water in zeolite is prevented. At the same time, in comparison with the conventional carbon adsorbent, increment of the amount of $CO_2$ recovered and improvement of the recovery of $CO_2$ gas can be obtained. Thus, the present invention has been attained.

SUMMARY OF THE INVENTION

That is, the main object of the present invention is to provide a process for separation and recovery of a high purity $CO_2$ from a wet gas containing $CO_2$ efficiently according to PSA method, and the gist thereof is a process for separation and recovery of a high purity $CO_2$ from a wet mixed gas containing $CO_2$ which comprises using a pressure swing adsorption and separation apparatus composed of an adsorber packed with alumina gel and zeolite and carrying out the steps of adsorption, washing, desorption and pressurization.

1: blower, 2: gas heat exchanger, 3: gas chiller, 4A, 4B, 4C and 4D: adsorbers, 5: vacuum pump, 6: water cooler, 7: chiller, 8: gas heater, 11 to 17: pipe lines.

Figure 1:
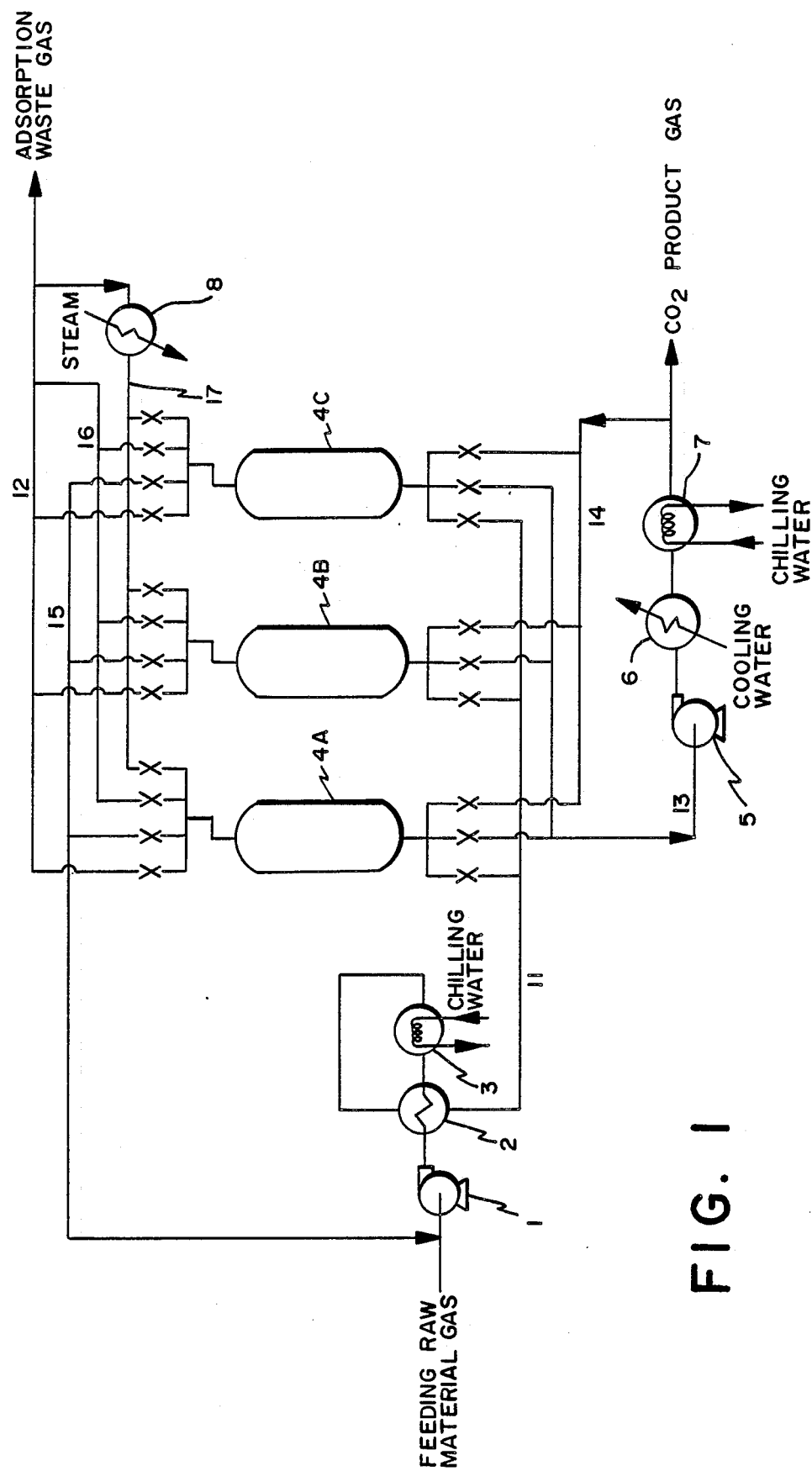
FIG. 1 is a flow diagram of an apparatus composed of three adsorbers. The references numerals in FIG. 1 indicate the following equipment, respectively.
Figure 2:
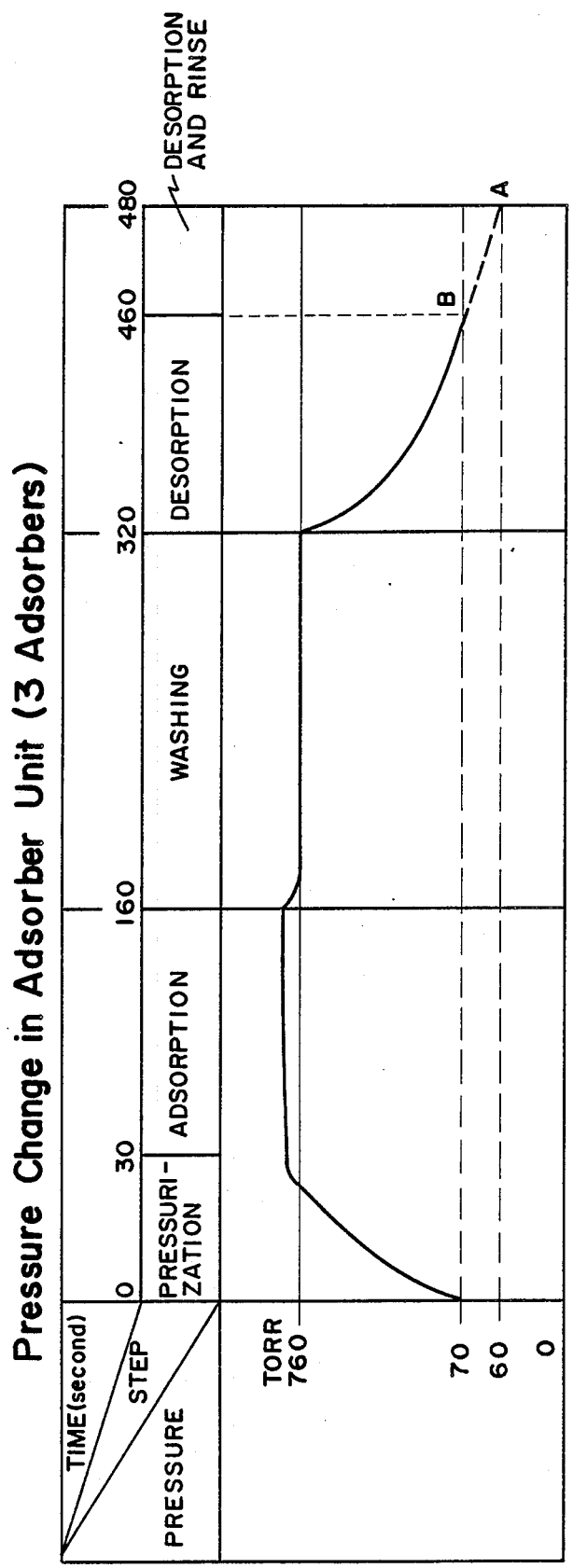

FIG. 2 is a schematic diagram illustrating pressure change in the adsorber as shown in the system having three adsorbers of FIG. 1.

Figure 3:
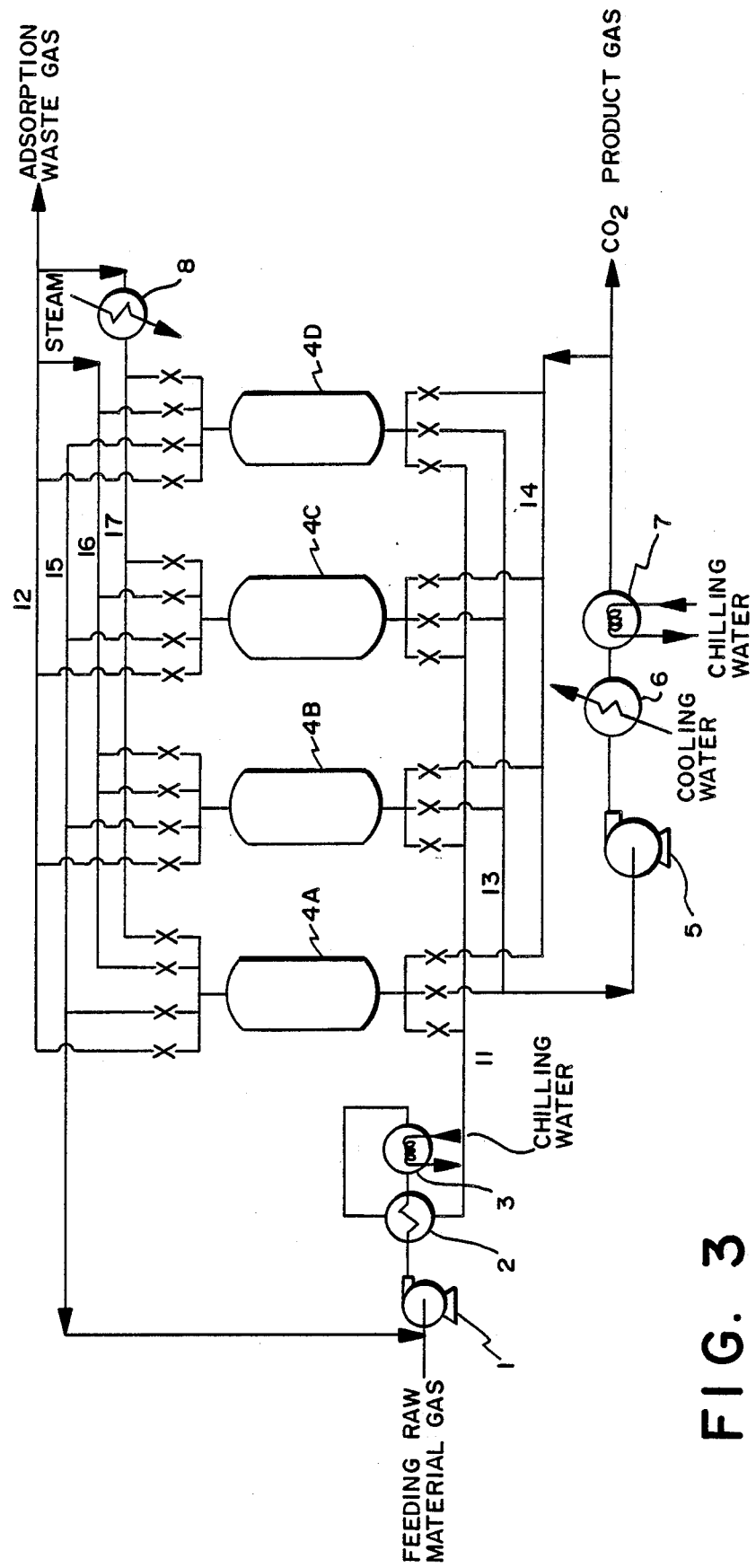

FIG. 3 is a flow diagram of an apparatus composed of four adsorbers and the equipment indicated by the reference numerals 1 to 8 are the same as those shown in FIG. 1.

DETAILED DESCRIPTION OF THE INVENTION

Hereinafter, the present invention is illustrated in detail.

As the adsorbent to be used, there can be used alumina gel for removing water. Suitably, the composition thereof is 20 to 50% by weight of $Al_2O_3$ and 80 to 50% by weight of $SiO_2$, more preferably, 40 to 45% by weight of $Al_2O_3$ and 60 to 55% by weight of $SiO_2$.

Since alumina gel having such a composition has an excellent balance between water adsorption and desorption rates and water adsorption capacity, good results can be obtained. On the other hand, as the adsorbent for separation of $CO_2$, zeolite can be used. Particularly, among zeolites, it is preferred to use 10A type zeolite having excellent water adsorptivity and desorptivity. These adsorbents are packed without mixing. Alumina gel is packed at the raw material gas inlet side, while zeolite is packed at the outlet side. The ratio of these adsorbents is of importance. Preferably, the volume ratio of alumina gel : zeolite is in the range between 1:10 and 1:2. More preferably, when the ratio is between 1:5 and 1:3, good results can be obtained.

The reason for this is considered as follows. In the case of recovery of $CO_2$ as described above, $CO_2$ adsorbed by zeolite is desorbed during desorption and the resulting $CO_2$ is utilized as a regeneration gas for alumina gel. Therefore, when the ratio of alumina gel is too large, the amount of the regeneration gas for alumina gel becomes insufficient, which results in lowering of the ability for removing water. To the contrary, when the amount of alumina gel is too small, the total adsorption capacity of water becomes insufficient and a large amount of water is carried in a zeolite layer, which results in lowering of adsorptivity of $CO_2$ in the zeolite layer.

As conditions for the feeding raw material gas, when the concentration of $CO_2$ is higher, a larger amount of $CO_2$ and, therefore, the $CO_2$ product gas used for washing becomes smaller. Thus, a larger amount of the $CO_2$ product gas can be obtained. The concentration of $CO_2$ which is available depends upon the ultimate pressure (degree of vacuum) during desorption.

That is, as the desorption pressure becomes lower, the adsorbent is regenerated more sufficiently and, therefore, recovery of $CO_2$ becomes larger. And, even by using a raw material gas having a low $CO_2$ concentration, recovery of $CO_2$ can be also increased. However, as a matter of course, when the desorption pressure becomes lower, more power is needed and, therefore, it is rather uneconomical in view of the amount of the recovered $CO_2$.

On the other hand, in view of the capacity of industrial vacuum generating equipment, the ultimate desorption pressure is limited to about 10 Torr and, in this case, the lower limit of the concentration of $CO_2$ in the feeding raw material is 8% by volume. HOwever, when economical efficiency of the $CO_2$ to be recovered which has a purity of 98 to 99% by volume is taken into consideration, the desorption pressure is suitably about 40 to 60 Torr and the concentration of $CO_2$ in the raw material gas which is available is preferably not less than 20% by volume. Further, when the concentration of $CO_2$ in the raw material gas is not less than 50 to 60% by volume, power used can be reduced by raising the desorption pressure to 200 Torr. This is more advantageous.

The raw material gas which is available in the present invention is usually a gas containing $N_2$ as the main component and $CO_2$ such as a combustion gas, a lime furnace waste gas or the like. Since the component to be adsorbed is $CO_2$, as a matter of course, the present invention is also applicable to $CO_2$ contained in a gas having an adsorptivity smaller than that of $CO_2$, for example, $H_2$, $O_2$ or the like.

In general, a combustion gas containing $N_2$ as the main component is generated at a high temperature. Therefore, when such a gas is used, it is fed as the raw material gas after cooling it with water to about normal temperature. In this case, the water content becomes higher and, when the raw material gas is fed as it is, water is remarkably accumulated in the adsorber, which makes continuation of the PSA operation impossible. Accordingly, it is desired that the gas is cooled so that the dew point of water becomes about 5° to 20° C., preferably, about 10° to 15° C. In comparison with the conventional method wherein the gas is cooled so that the dew point becomes $-50°$ C. or lower, cooling in the above degree does not become an economical burden. When the temperature of the feeding gas is lower, the amount of $CO_2$ adsorbed in the adsorbent becomes larger. On the other hand, desorption becomes difficult. When the temperature becomes higher, the opposite tendency appears. Accordingly, it is preferred that the feeding raw material gas is fed to the adsorber at a temperature range of 10° to 50° C., more preferably, 25° to 40° C.

Hereinafter, as preferred embodiments of the present invention, a process for recovery of a high purity $CO_2$ from a wet mixed gas by using an adsorber wherein alumina gel is packed at the feeding raw material gas inlet side and zeolite is packed at the downstream side thereof according to the PSA method is explained in detail with reference to the accompanying drawings.

FIG. 1 is a flow diagram of a separation apparatus for the PSA method composed of three adsorbers and it is operated by carrying out the steps of pressurization, adsorption, washing, desorption and desorption and rinse according to the operation shown in Table 1.

TABLE 1

| Adsorbers | Operation (three adsorbers) Time (seconds) | | | | | |
|---|---|---|---|---|---|---|
| | 0 | 30 | 160 | 320 | 460 | 480 |
| 4A | Pressurization | Adsorption | Washing | | Desorption | Desorption-rinse |
| 4B | | Washing | | Desorption | Desorption-rinse | Pressurization | Adsorption |
| 4C | Desorption | Desorption-rinse | Pressurization | Adsorption | | Washing |

The feeding raw material gas is fed from a blower 1. When the water content in the raw material gas is high, the gas is subjected to dehumidification by passing through a gas heat exchanger 2 and a gas chiller 3 so that the dew point of water becomes about 10° to 15° C., and reheated to about 30° C. with, for example, the gas heat exchanger 2 and then fed to the adsorber through a pipe line 11.

When the dew point of water is not more than 10° C., as a matter of course, the gas is simply heated After the raw material gas is fed and the adsorption step is completed, the gas is transferred to a washing step and a part of the desorbed and recovered high purity $CO_2$ is introduced into the adsorber through a pipe line 14 to replace the non-absorbed gas remaining in the adsorber with the $CO_2$. In this case, the waste gas discharged from the outlet is recycled to the raw material gas through a pipe line 15. After completion of the washing step, the gas is desorbed under vacuum with a vacuum pump 5.

In this desorption step, the completely dried adsorption waste gas which has been discharged from the pipe line 16 to pressurize the adsorber. By utilizing this adsorption waste gas for pressurization, the water adsorption front can be effectively depressed.

In the case of the apparatus composed of four adsorbers as shown in FIG. 3, the operation is carried out according to the steps as shown in Table 2. Different from the system having three adsorbers, pressurization is carried out only by the adsorption waste gas and this step is carried out as an independent step. That is, only the completely dried adsorption waste gas generating from the adsorption step of another adsorber can be filled in the adsorber, wherein desorption has been completed, from the inlet opposite to the raw material feeding side.

TABLE 2

| | Operation (four adsorbers) | | | | | |
|---|---|---|---|---|---|---|
| | Time (seconds) | | | | | |
| Adsorbers | 0 | 160 | 320 | 460 | 480 | 640 |
| 4A | Adsorption | | Washing | Desorption | Desorption-rinse | Pressurization |
| 4B | Washing | | Desorption | Desorption-rinse | Pressurization | Adsorption |
| 4C | Desorption | Desorption-rinse | Pressurization | | Adsorption | Washing |
| 4D | Pressurization | | Adsorption | | Washing | Desorption Desorption-rinse | adsorption step and heated to 80° to 100° C. is fed from the inlet opposite to the adsorption gas outlet through a pipe line 17 just before completion of the desorption step. This gas should be fed in such an amount that the purity of the desorption gas is not lowered. Therefore, the feeding of the gas is started at a certain stage just before completion of the desorption step, for example, at a stage where the pressure becomes about 10 Torr higher than the final ultimate pressure obtained without feeding the waste gas or, usually, about 20 seconds before the completion of the step. If the gas is limited to such an amount that the pressure in the adsorber during its feeding is kept constant, the purity of $CO_2$ to be recovered is not lowered.

FIG. 2 is a schematic diagram of a pressure change in the adsorber as shown in the above apparatus composed of three adsorbers. FIG. 2 illustrates the following difference in pressure change. When the desorption and rinse is not carried out in the desorption step, the final ultimate pressure reaches 60 Torr (point A). However, the pressure is maintained at 70 Torr by introducing the adsorption waste gas from the inlet opposite to the desorbed gas outlet to carry out desorption and rinse, when the pressure reaches 70 Torr at 20 seconds before completion of the desorption step (point B).

Thus, by feeding the adsorption waste gas as a high-temperature dried gas during desorption, the amount of a gas for desorption of water is increased and the amount of heat which is necessary for the desorption can be supplied. Therefore, this is extremely advantageous for regeneration of the adsorbents.

The gas discharged from the vacuum pump is cooled to 30° to 35° C. with a cooling water in a water cooler 6. For the purpose of reducing the amount of water carried in the adsorbent, it is effective to further remove water with a cooler 7 using chilling water. Preferably, if the gas is cooled below 20° C., the amount of alumina gel to be packed can be reduced.

After completion of desorption, the feeding raw material gas is introduced into the adsorber. At the same time, the adsorption waste gas retained in the pipe line 12 is also charged from the opposite side through the When this adsorption waste gas is used, recovery of $CO_2$ is further improved because the concentration of $CO_2$ in the waste gas is low and it is effective for desorption of the $CO_2$ still retained in the adsorbent.

To the contrary, in the system having three adsorbents, the adsorption waste gas utilized for pressurization is that merely retained in the pipe line and is in the stage just before completion of adsorption. Therefore, concentration of $CO_2$ is the same as that of the raw material gas and it is not so effective for desorption of $CO_2$ in the adsorbent as conducted by the gas scarcely contains $CO_2$ in the system having four adsorbents.

In the case where the raw material gas is an ordinary combustion gas, the adsorption pressure in the PSA method of the present invention is atmospheric pressure and, when the feeding pressure is raised, the amount of power which is necessary for pressurization becomes larger. This is economically disadvantageous. However, by raising the adsorption pressure, the partial pressure of $CO_2$ increases and the adsorption of $CO_2$ also increases, which increases in recovery.

Particularly, in the case where the concentration of $CO_2$ in the feeding raw material gas is low, it is effective to raise the adsorption pressure. Accordingly, the operation is carried out by setting the adsorption pressure in the range between atmospheric pressure and 4 $kg/cm^2G$, preferably, between atmospheric pressure and 0.5 $kg/cm^2G$.

Hereinabove, the systems composed of three and four adsorbers are explained as the preferred embodiments of the present invention. The present invention can also be applied to a system having two adsorbers or five or more adsorbers by carrying out the four steps of adsorption, washing, desorption and pressurization according to the above embodiments.

EXAMPLES

The following Examples and Comparative Examples further illustrates the present invention in detail but are not to be construed to limit the scope thereof.

EXAMPLE 1

A PSA separation apparatus composed of three adsorbers wherein, as the adsorbents, commercially available alumina gel ($Al_2O_3$: 40% by weight, $SiO_2$: 60% by weight) 32 liters is packed at the raw material gas inlet side and commercially available X-10A type synthetic zeolite 96 liters is packed at the downstream side (total: 128 liters) in volume ratio of 1:3 was operated with the switching time of 160 seconds according to the steps as shown in Table 1.

The gas having the composition of $CO_2$: 27% by volume, $O_2$: 2% by volume, $N_2$: 70% by volume and $H_2O$: 1% by volume (dew point: 10° C. at atmospheric pressure) was fed at 35° C. in the flow rate of 77 $Nm^3/H$.

Adsorption pressure was 0.05 $kg/cm^2G$ and desorption pressure was 70 Torr. As a result, $CO_2$ product gas having a concentration of 99% by volume was obtained at the rate of 13.8 $Nm^3/H$. The recovery of $CO_2$ was 66.4%. In this operation, the vacuum pump outlet gas was cooled to 30° C. and a part thereof was utilized as the washing gas.

COMPARATIVE EXAMPLE 1

By using the same apparatus as that in Example 1, 128 liters of commercially available activated charcoal of coconut shell alone was packed as the adsorbent and the apparatus was operated according to the same conditions as those described in Example 1. As a results, $CO_2$ product gas having a concentration of 99% by volume was obtained in the flow rate of 10.45 $Nm^3/H$.

The recovery of $CO_2$ was 50.3%.

EXAMPLE 2

By using an apparatus composed of four adsorbers each of which contained the same adsorbents and had the same volume as those described in Example 1, the operation was carried out with the switching time of 160 seconds according to the steps as shown in Table 2.

The raw material gas having the same composition as that described in Example 1 was fed at 35° C. in the flow rate of 70 $Nm^3/H$. In the operation, the vacuum pump outlet gas was cooled to 20° C. and a part thereof was utilized as the washing gas. As a result, $CO_2$ product gas having a concentration of 99% by volume was obtained in the rate of 14.1 $Nm^3/H$.

The recovery of $CO_2$ was 74.6%.

COMPARATIVE EXAMPLE 2

By using the same apparatus as that described in Example 1, 128 liters of 10A type zeolite alone was packed as the adsorbent and the operation was carried out according to the same conditions as described in Example 2.

As a result, $CO_2$ product gas having the concentration of 99% by volume was obtained in the rate of 8.1 $Nm^3/H$ and the recovery of $CO_2$ was 38.4%.

EXAMPLE 3

By using the same apparatus as that described in Example 1, pressurization, adsorption, washing and desorption were carried out as the operation steps. However, the desorption and rinse with the adsorption waste gas was not carried out. The desorption ultimate pressure was 60 Torr.

The raw material gas was fed in the flow rate of 77 $Nm^3/H$ and the $CO_2$ product gas having the concentration of 99% by volume was obtained at the rate of 13.3 $Nm^3/H$.

The recovery of $CO_2$ was 64%.

EFFECT OF THE INVENTION

In the case of recovering a high purity $CO_2$ having a purity of not less than 99% from a wet mixed gas containing $CO_2$, there has been hitherto used a carbon adsorbent whose water adsorption and desorption properties are weak and, therefore, whose separation ability of $CO_2$ is hardly affected by water.

According to the present invention, by combining zeolite whose separation ability of $CO_2$ is known to be better than the carbon adsorbent but lowered in the presence of water with alumina gel, and by utilizing the adsorption waste gas in pressurization and desorption and rinse, a high purity $CO_2$ gas is efficiently recovered without adverse affect of water.

As is clear from Example 1 and Comparative Example 1, the yield of the product obtained according to the present invention is 1.32 times as much as that obtained by the conventional carbon adsorbent. Since most of the running cost in the recovery of $CO_2$ is occupied by the power cost, 24% of the running cost can be reduced if the amount of the gas generated by using the same apparatus is increased by 1.32 times. Further, the recovery of $CO_2$ is also improved by about 1.32 times and the raw material feeding gas is also reduced and, thereby, power to be used is further reduced.

And, in the case of using the apparatus composed of four adsorbers as shown in Example 2, about 8% of the recovery is improved. Accordingly, the present invention has industrial advantages.

We claim:

1. A process for separating and recovering a high purity carbonic acid gas from a wet mixed gas containing carbonic acid gas according to a pressure swing adsorption and separation method which comprises using a pressure swing adsorption and separation apparatus having at least three adsorbers, each of which is paced with alumina gel and zeolite, comprising the steps of:
   providing the amount of carbonic acid gas in a feeding raw material gas at least 8% by volume;
   providing the alumina gel at a composition of 20 to 50% by weight of $Al_2O_3$ and 80 to 50% by weight of $SiO_2$, and packed at a feeding gas inlet side of the adsorber;
   providing a 10A type zeolite packed at the downstream side of the adsorber;
   providing a packing volume ratio of the alumina gel to zeolite of between 1:10 and 1:2; and
   carrying out the steps of adsorption, washing, desorption and pressurization in each adsorber in one operation sequence.

2. The process according to claim 1, wherein water in the feeding raw material gas is such that the dew point thereof, at atmospheric pressure, is −50° C. or higher and a temperature thereof is in the range between 10° C. and 50° C.

3. The process according to claim 1, wherein the steps for adsorption, washing and desorption are carried out by using an apparatus composed of three adsorbers and, when the desorption step is completed, a feeding raw material gas is introduced into the adsorber from a raw material inlet side and an adsorption waste gas is introduced into it from an outlet side to carry out the pressurization step.

4. A process according to claim 1, wherein four steps of adsorption, washing, desorption and pressurization is carried out by using an apparatus composed of four adsorbers and the pressurization step is carried out by utilizing only an adsorption waste gas.

5. A process according to claim 1, wherein dehumidification is carried out so that the dew point of water in a high purity carbonic acid gas becomes not higher than 35° C. and the resulting gas is utilized for the washing step.

6. The process according to claim 1, wherein the adsorption waste gas heated to a temperature in the range between normal temperature and 100° C. just before completion of the desorption step is introduced into an adsorber from an opposite side of a desorption gas outlet to carry out desorption and rinse.

* * * * *